(12) United States Patent  
Villarino-Villa (10) Patent No.: US 10,153,893 B2  
(45) Date of Patent: Dec. 11, 2018

(54) ANALYSIS DEVICE, ANALYSIS METHOD AND COMPUTER READABLE MEDIUM

(71) Applicant: Rohde & Schwarz GmbH & Co. KG, München (DE)

(72) Inventor: Ruben Villarino-Villa, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 20 days.

(21) Appl. No.: 15/362,243

(22) Filed: Nov. 28, 2016

(65) Prior Publication Data

US 2017/0155500 A1  Jun. 1, 2017

Related U.S. Application Data

(60) Provisional application No. 62/260,996, filed on Nov. 30, 2015.

(51) Int. Cl.
| | |
|---|---|
| *H04L 7/02* | (2006.01) |
| *H04J 3/06* | (2006.01) |
| *H04L 1/20* | (2006.01) |

(52) U.S. Cl.  
CPC .............. *H04L 7/02* (2013.01); *H04J 3/0685* (2013.01); *H04L 1/20* (2013.01)

(58) Field of Classification Search  
CPC .............................. H04L 7/02; H04L 7/0087  
See application file for complete search history.

(56) References Cited

U.S. PATENT DOCUMENTS

| | | | | |
|---|---|---|---|---|
| 5,553,095 A | * | 9/1996 | Engdahl | G05B 19/0421 370/462 |
| 2014/0215109 A1 | * | 7/2014 | Hopfner | G06F 13/36 710/105 |
| 2015/0326386 A1 | * | 11/2015 | Shimada | H04L 7/033 375/355 |
| 2016/0080168 A1 | * | 3/2016 | Lieder | H04L 12/40032 370/468 |
| 2017/0093659 A1 | * | 3/2017 | Elend | H04L 43/08 |

* cited by examiner

*Primary Examiner* — Freshteh N Aghdam  
(74) *Attorney, Agent, or Firm* — Shumaker & Sieffert, P.A.

(57) ABSTRACT

An analysis device for analyzing a data signal in an electronic system comprises a signal input for receiving the data signal, a memory unit to buffer the data signal, a signal decoder which is coupled to the memory unit and decodes frames of the data signal, an identification unit coupled to the decoder for identifying a number of the frames and/or at least one sub-frame of the frames which comply with a predetermined frame content condition, and a signal processor which is coupled to the memory unit and processes the data signal according to the identified at least one frame or sub-frame and according to respective timing information.

22 Claims, 5 Drawing Sheets

ANALYSIS DEVICE, ANALYSIS METHOD AND COMPUTER READABLE MEDIUM

PRIORITY CLAIM

This application claims the benefit of U.S. Provisional Patent Application Ser. No. 62/260,996, filed Nov. 30, 2015; the disclosure of which is incorporated herein by reference in its entirety.

TECHNICAL FIELD

The invention relates to an analysis device for analyzing a data signal in an electronic system. Furthermore, the invention relates to an according analysis method and a non-transitory computer readable medium.

BACKGROUND

Although applicable to any system that records or measures data signals, the present invention will primarily be described in combination with oscilloscopes.

Modern electronic systems can comprise a plurality of single electronic nodes. These nodes can e.g. be coupled to one another via data lines. In electronic systems with a plurality of electronic nodes, digital bus systems couple the electronic nodes to one another.

To analyze the data quality of the electric signals on the data lines of the digital bus system oscilloscopes can be used, to display the electric voltages on the data lines.

There is a need for more flexibility in the analysis of data signals in electronic signals.

SUMMARY

The analysis device for analyzing a data signal in an electronic system, like a field bus or the like, comprises a signal input for receiving the data signal, a memory unit to buffer the data signal, a signal decoder which is coupled to the memory unit and decodes frames of the data signal, an identification unit coupled to the decoder for identifying a number, i.e. one or more, of the frames and/or at least one sub-frame of the frames which comply with a predetermined frame content condition, and a signal processor which is coupled to the memory unit and processes the data signal according to the identified at least one frame or sub-frame and according to respective timing information.

The analysis method for analyzing a data signal in an electronic system comprises receiving the data signal, buffering the data signal, decoding frames of the data signal, identifying at least one of the frames and/or at least one sub-frame of the frames which comply with a predetermined frame content condition, and processing the data signal according to the identified at least one frame or sub-frame and according to respective timing information.

The non-transitory computer readable medium comprises computer instructions, which when executed by a processor cause the processor to perform a method according to the present invention.

The present invention is based on the conclusion that especially in networks of electronic systems, like e.g. a field bus with a plurality of nodes, simply monitoring the data signals of all nodes might not suffice to analyze the signal quality of the system in detail.

Therefore, the present invention provides a device, which is capable of selectively analyzing a data signal, i.e. the waveform or voltage signal transmitted in the electronic system.

To provide such selective analyzing capabilities the present invention records the raw data signal and buffers the recorded raw data in a memory unit. This memory unit can be a long term memory, i.e. a memory of a size sufficient to store a large amount of samples for the raw data, e.g. a hard drive. Buffering the signal allows processing the data signal without the requirement of recording further data signal transmission at the same time. Therefore, the work load in the identification unit and the signal processor can be reduced or the recorded data signal can be analyzed and processed independently of the recording operation. Alternatively this memory can be a buffer of a real time analysis device.

The signal decoder decodes from the buffered data signal frames, which can comprise a number of sub-frames, like e.g. synchronization sub-frames, address sub-frames or data sub-frames, depending on the type of electronic system.

The identification unit analyses the data signal by searching for specific frame content conditions in the decoded frames. The frame content conditions delimit a section, e.g. a frame, of the content of special interest or indicate the positions of such sections in the data signal. For example an address sub-frame with a respective address can mark a frame as such a content of special interest.

Finally, the signal processor knows based on the results provided by the identification unit, where in the data signal the sections or content of special interest are located. Using this knowledge the signal processor can selectively process and analyze only the relevant or matching sections of the data signal.

Summing up, the present invention allows an engineer or developer to selectively analyze e.g. the traffic on a field bus. By defining the respective frame content conditions the engineer or developer can exactly and granularly define which sections or portions of the data signal, i.e. the actual waveform transmitted on the field bus, he wants to process and analyze.

Further embodiments of the present invention are subject of the further subclaims and of the following description, referring to the drawings.

In a possible embodiment the signal processor can generate an eye diagram for the sections of the data signal, which correspond to the identified at least one frame or sub-frame. Furthermore, a display unit can be provided, which displays the eye diagram generated by the signal processor. In an eye diagram a digital signal from a receiver is repetitively sampled and superimposed or overlaid in a timely aligned manner. Producing an eye diagram only for the sections of the data signal, which correspond to the occurrences of the frame content conditions therefore allows selectively analyzing specific data transmissions in a data transmission system. For example in a CAN-Bus with a plurality of nodes the eye diagram can be generated only for data packages which are sent by a single node.

In a possible embodiment the identification unit can comprise a clock recovery module, which recovers the timing information from a clock of the data signal. The clock recovery module can e.g. analyze a synchronization of the electronic system. Such synchronization is visible in the data signal and regularly characterized by data frame content conditions which are not used during normal operation. Such patterns can be recognized and used to virtually synchronize the clock recovery module with the electronic system, thereby recovering the clock. In a possible embodiment the clock recovery module can recover the timing information from a separate clock signal, which can e.g. be transmitted alongside the data signal.

In a possible embodiment the signal processor can decompose sections of the data signal, which correspond to the identified at least one frame or sub-frame, into sections of a predetermined length before and/or after a reference point in time. The predetermined length can vary from half-bit size to one-bit size to a size comprising several bits or a complete frame or more than one frame. Further the signal processor can superimpose or overlay the sections time aligned to generate the eye diagram. This facilitates the generation of the eye diagram. The decomposition of the data signal can especially be based on the recovered timing information. The timing information and the knowledge of the respective data transmission format allow predicting the start and end points of frames, sub-frames or single bits in the data signal. Therefore, using the recovered timing information makes it a simple task to decompose the data signal into respective sections. Therefore the task of generating the eye diagram can be simplified.

In a possible embodiment the identification unit can decode the content of the data signal according to a predetermined data communication standard like a controller area network (CAN)-based bus standard and/or a FlexRay bus standard and/or a serial peripheral interface (SPI)-Bus standard and/or an inter-integrated circuit ($I^2C$) Bus standard or the like. Providing the capability of analyzing the data signal according to different communication standards or data transmission standards makes the analysis device more flexible to use in a variety of different applications.

In a possible embodiment the specific frame content conditions instruct the identification unit to identify frames or sub-frames, which are sent by a specific node in the electronic system. This means that the specific frame content conditions can e.g. be any characteristic frame content condition, which couples data in the data signal to a specific node.

In a possible embodiment a specific frame content condition can instruct the identification unit to identify frames or sub-frames, based on a device address of the specific node in the electronic system. Such an address can e.g. be included in an address sub-frame. In data transmissions on e.g. a digital bus the device address of the sending and/or the receiving node is regularly included in the data transmission. Therefore using said addresses as frame content conditions to select the respective occurrences in the content of the data signal makes the selection process very simple.

In a possible embodiment the specific frame content conditions can instruct the identification unit to identify only data frames or sub-frames of the data signal without synchronization frames or synchronization patterns or the like. During synchronization of e.g. a data bus large jitter or the like may be experienced on the bus. Therefore, by skipping the synchronization patterns for the generation of the eye diagram the quality of the eye diagram and the relevance of the eye diagram can be improved.

In a possible embodiment the specific frame content conditions can instruct the identification unit to identify only frames or sub-frames transmitted at a specific data rate. Some bus systems support a mixed data rate operation. For example nodes on a controller area network flexible data rate (CAN-FD) bus can transmit data at different data rates of up to 8 Mbit/s.

In a possible embodiment the specific frame content conditions can instruct the identification unit to identify only frames or sub-frames, which comprise actual data transmissions without idle intervals. If idle intervals are not used for the generation of the eye diagram, especially on differential bus systems the zero volts line can be excluded from the eye diagram.

In a possible embodiment the specific frame content conditions can instruct the identification unit to identify frames or sub-frames based on a specific address sub-frame and/or a specific sub-frame comprising cyclic redundancy check information and/or a number of other predetermined conditions. Therefore, a specific frame content condition may comprise a number of different frame content sub-conditions that are combined to form a new, more complex frame content condition.

In such complex frame content conditions, the specific address sub-frame can comprise a single node address of a respective node in the electronic system or a number of node addresses, e.g. a range or a list of single node addresses. The sub-frame comprising cyclic redundancy check information can e.g. refer to frames, which are identified by the same cyclic redundancy check error.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
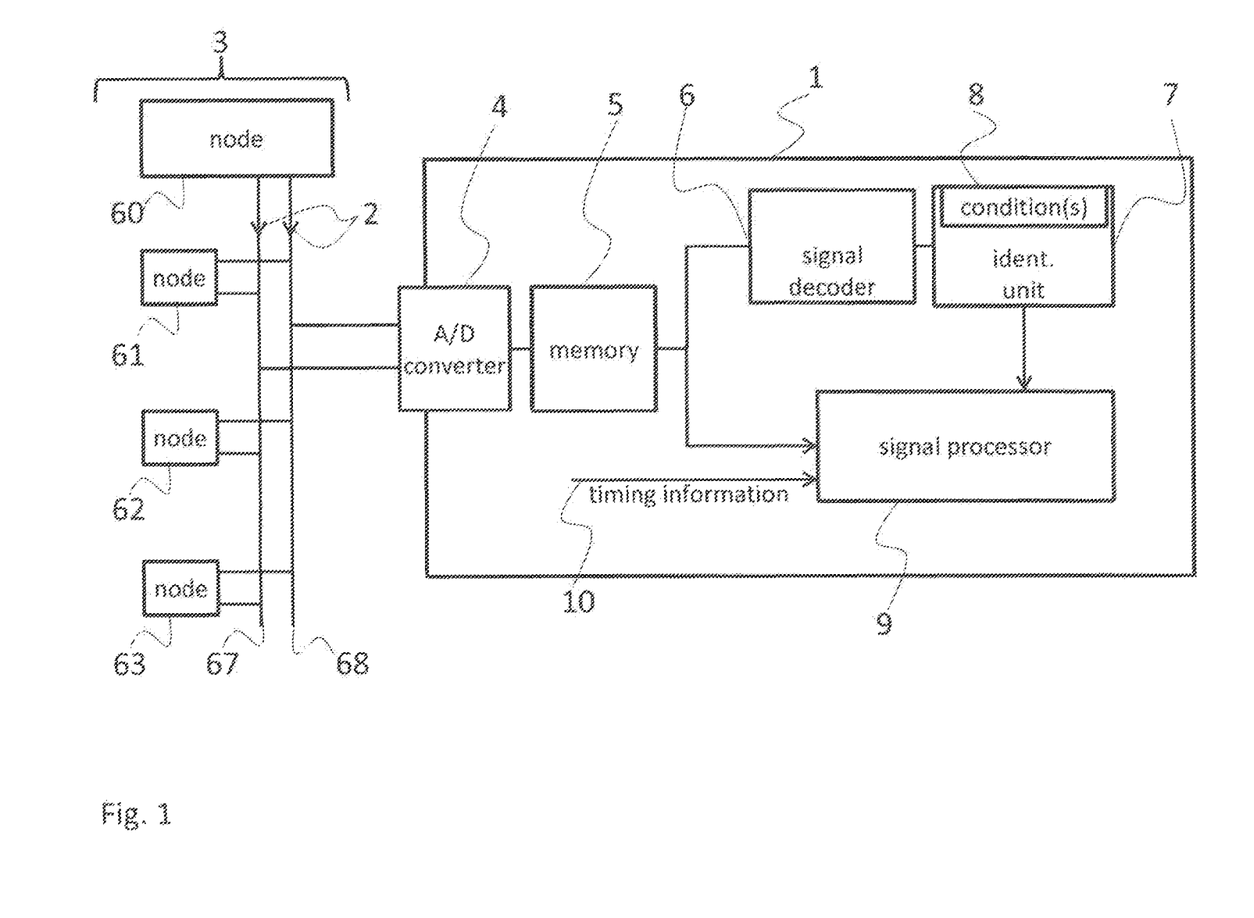
FIG. 1 shows a block diagram of an embodiment of an analysis device according to an embodiment of the present invention.

FIG. 1 shows a block diagram of an embodiment of an analysis device 1 according to the present invention, which is coupled to an electronic system 3.

The electronic system 3 is a digital bus system in which a master node 60 controls a plurality of slave nodes 61-63 via a differential data communication. Differential in this case refers to a data communication where two data lines 67, 68 are used and one data line 67 carries a voltage representing the transmitted data signal 2 while the other data line 68 carries the respective inverted voltage. If for example the first data line 67 carries a positive voltage, which represents a logic "1", the other data line 68 carries a respective negative voltage. On the other hand, if the first data line 67 carries a negative voltage, which represents a logic "0", the other data line 68 carries a respective positive voltage (see e.g. FIG. 5). In this regard negative refers to a voltage which is negative with respect to a given reference voltage. For example in an exemplary CAN-Bus system the positive voltage can be about 3.5V while the negative voltage can be 1.5V. The reference voltage in this case is 2.5V. It is to be understood that other bus systems and voltages are also possible. Especially, a reference voltage of 0V is also possible.

The analysis device 1 is connected to the electronic system 3 via the signal input 4, which is an analog-to-digital (A/D) converter and which receives the data signal 2 and forwards the data signal 2 to the buffer memory 5. From the buffer memory 5 the data signal is provided to the signal decoder 6, which will receive the data signal 2 and decode frames and/or sub-frames of the data signal 2.

The frames or sub-frames of the data signal 2 here are the actual digital data transmitted over the data lines 67, 68. Consequently, while the frames or sub-frames represent the respective digital data, the data signal 2 represents the analogue waveforms which are transmitted over the data lines 67, 68.

In order to decode the frames or sub-frames the signal decoder 6 can comprise a description of the waveforms and the respective digital content. For example for differential data transmissions the signal decoder 51 can comprise the bit length, the reference voltage and the respective positive and negative voltage values, which represent digital "1" and "0". Furthermore, the signal decoder 51 can comprise a description of synchronization patterns, data packets with leading or trailing additional information, like checksums or the like, of a respective data communication system or data bus. The process of decoding the content 6 can be e.g. performed by comparing the waveforms to the above information.

The decoded content is then provided to the identification unit 7, which tries to identify in the frames or sub-frames specific frame content conditions 8, which can be predefined for a specific analysis task. The specific frame content conditions 8 can e.g. define specific digital data or digital bit patterns, like node addresses, and respective positions of the data signal 2.

For example one frame content condition 8 can be a node address of a node 60-63 in the electronic system 3 and the respective position can be the leading part or sub-frame of a frame where the sender's address is provided. That means, that the identification unit 7 will mark the sub-frames of the data signal 2, which correspond to the occurrences of the respective node address, and provide this information to the signal processor 9.

The specific frame content conditions 8 can also refer only to data frames or data sub-frames of the data signal 2. That means actual content of data packets without synchronization patterns, leading or trailing additional information and the like. The specific frame content conditions 8 can also comprise only data frames or sub-frames transmitted at a specific data rate. This is especially useful in multi-rate bus systems. Finally the specific frame content conditions 8 can also comprise only sections of the data signal 2 which comprise actual data frames or data sub-frames without idle intervals. It is to be understood that a combination of various frame content conditions 8 can also be provided. It is for example possible to analyze data packets transmitted by two or more nodes 60-63, by defining a respective number of frame content conditions 8, each containing the respective device address or a single frame content condition 8 with a range of addresses.

The signal processor 9 will then process only those parts of the data signal 2, i.e. the waveforms transmitted over data lines 67, 68, which correspond to the occurrences of the specific frame content condition 8 detected by the identification unit 7.

The processing performed by the signal processor 9 can e.g. comprise building or forming an eye diagram for the corresponding sections of the data signal 2, which correspond to the identified at least one frame or sub-frame. This can e.g. be done by decomposing the matching sections of the data signal 2 into sections of a predetermined length, each corresponding to a half-bit, a single bit, or a number of bits of the content, and superimposing the sections time aligned to generate the eye diagram.

Figure 2:
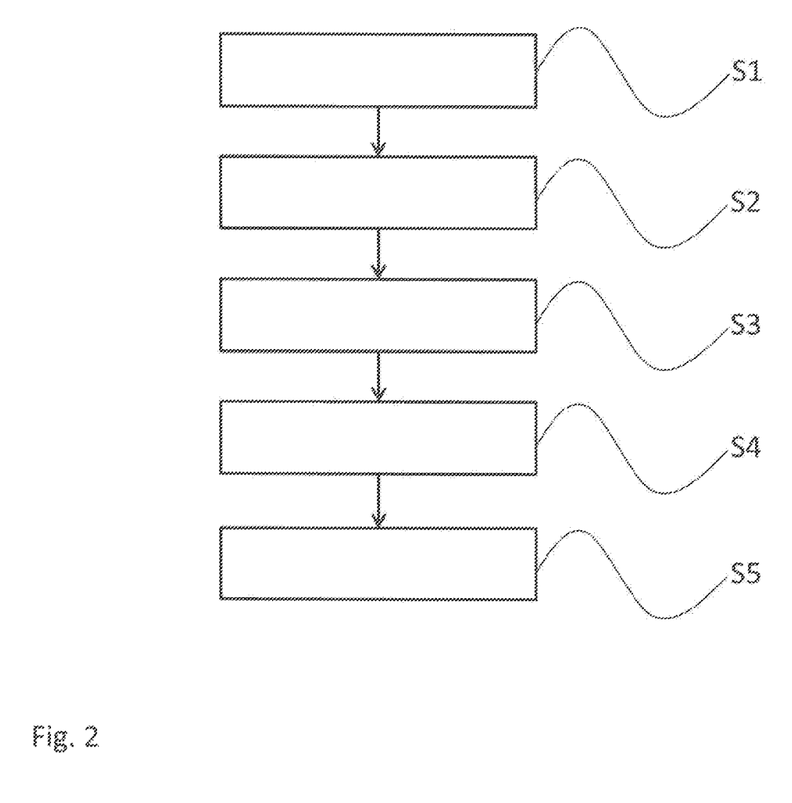
FIG. 2 shows a flow diagram of an embodiment of a method according to a further embodiment of the present invention.

FIG. 2 shows a flow diagram of an embodiment of a method for analyzing a data signal 2, 302, 400, 500 in an electronic system 3, 303. The method comprises receiving the data signal 2, 302, 400, 500 from the electronic system 3, 303. The data signal 2, 302, 400, 500 can e.g. be a differential or a non-differential data signal 2, 302, 400, 500.

First, the data signal 2, 302, 400, 500 is received, S1. Further, the received data signal 2, 302, 400, 500 is buffered, S2. Then the frames 401, 501 of the data signal 2, 302, 400, 500 are decoded, S3. Every frame 401, 501 can comprise a number of sub-frames 402, 403, 502, 503, 504. In the decoded frames 401, 501 at least one of the frames 401, 501 and/or at least one sub-frame 402, 403, 502, 503, 504 of the frames 401, 501 is identified, S4, which comply with a predetermined frame 401, 501 content condition 8. Finally, the data signal 2, 302, 400, 500 is processed according to the identified at least one frame 401, 501 or sub-frame 402, 403, 502, 503, 504 and according to respective timing information 10, 310.

In order to provide an eye diagram 312 the matching sections of the data signal 2, 302, 400, 500 can be decomposed into half-bit, or bit-wise sections or sections of a number of bits, corresponding to the content of the data signal 2, 302, 400, 500. Further, the sections can be superimposed or overlaid time aligned to generate the eye diagram 312.

In order to allow a simple decomposing and/or overlaying of the bit-wise or half-bit sections a timing information 10, 310, like a clock of the data signal 2, 302, 400, 500 can be recovered, e.g. from a separate clock signal or from the data signal 2, 302, 400, 500 itself.

Figure 3:
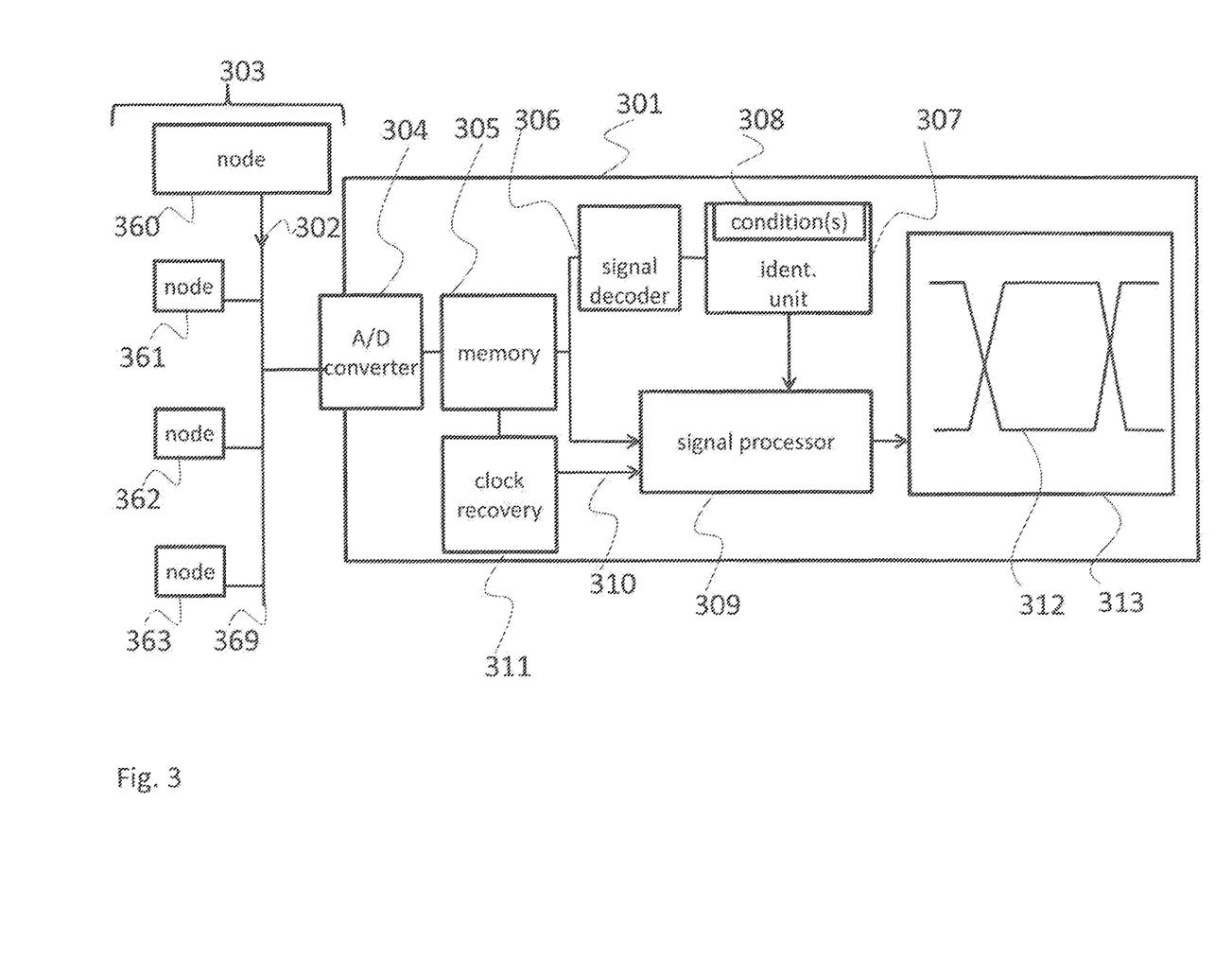
FIG. 3 shows a block diagram of an embodiment of an analysis device according to yet another embodiment of the present invention.

FIG. 3 shows a block diagram of an embodiment of an analysis device 301 which is based on the analysis device 1 of FIG. 1. In contrast to FIG. 1 the electronic system 303 comprises a non-differential data transmission over which the data signal 302 is transmitted. That means that e.g. a common ground can be used to determine the actual voltages on the data line 369.

In contrast to FIG. 1 the analysis device 301 comprises a clock recovery module 311, which extracts from the data signal 302 or decoded frames or sub-frames the timing information 310, which is the basis of the data transmission over data line 69.

The signal processor 309 uses the timing information 310, the data signal 302 and the information provided by the identification unit 307 to select the relevant sections of the data signal 302 and timely overlay these sections in order to provide an eye diagram 312, e.g. on a display 313.

The analysis device 301 can e.g. be a stand-alone oscilloscope or the like. As an alternative the analysis device 301 can e.g. be a combination of measurement hardware and an analysis program running on a respective computing device. Therefore, at least some of the elements of the analysis device 301 can be partially embedded in software or as a logic description like e.g. very high level design language (VHDL). For example the signal input 304 can be a dedicated hardware and the further components of the analysis device 301 can e.g. be implemented as a program running on a pc or a tablet computer. The data transmission between the signal input 304 and the computing device can e.g. be performed via universal serial bus (USB) or Bluetooth.

Figure 4:
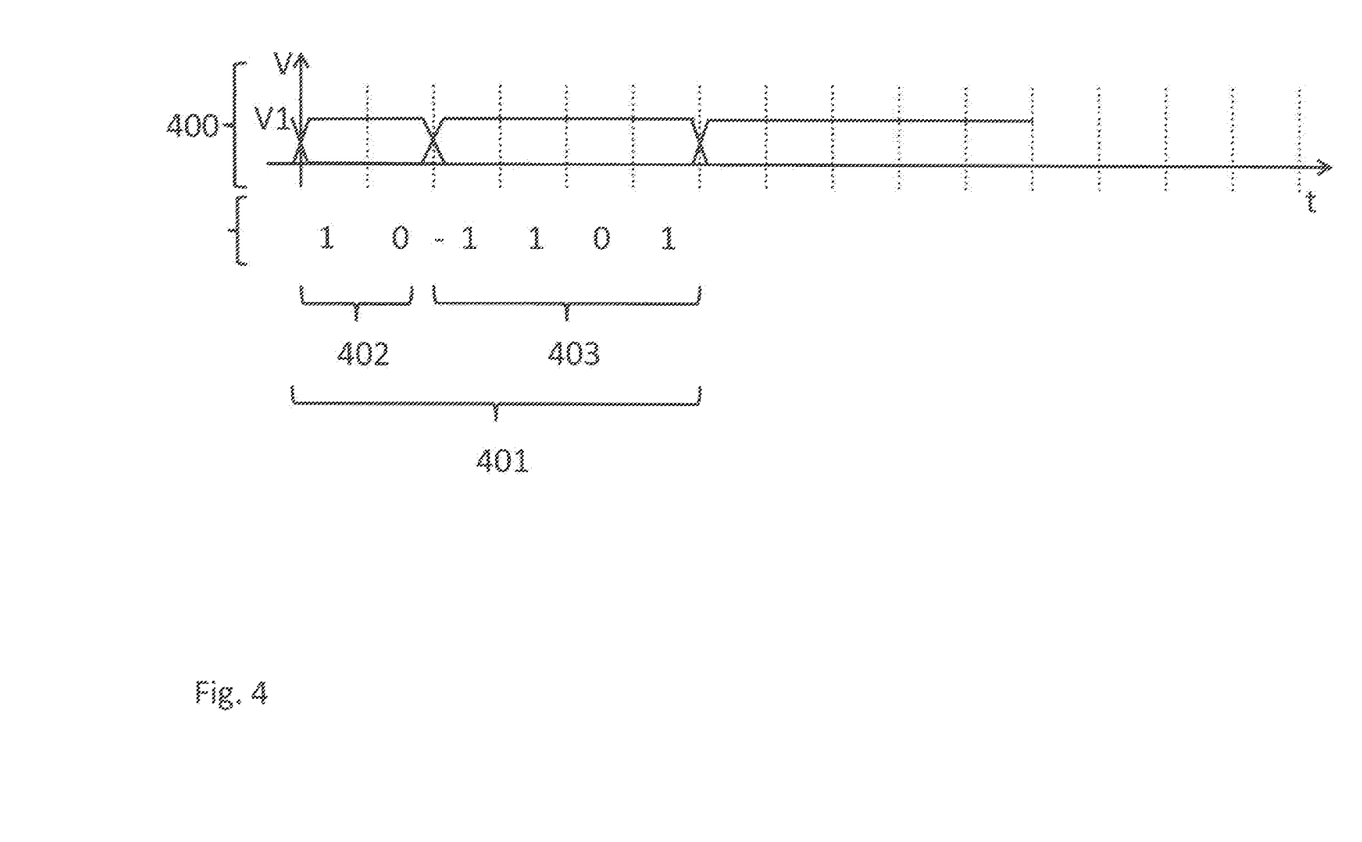
FIG. 4 shows possible content of a data signal.

FIG. 4 shows a frame 401 of a possible non-differential data signal 400. The abscissa of the diagram shows the time, while the ordinate depicts the voltage of the data signal 400.

A positive voltage of V1 denotes a logic "1" and a voltage of 0V denotes a logic "0". The bit length in time is denoted by dotted lines in each case.

In FIG. 4 the data frame 401 comprises two sub-frames 402, and 403. The address sub-frame 402 comprises the binary information "10" and the data sub-frame 403 comprises the binary information "1101".

Just for the sake of simplicity and for the understanding of the principles of the present invention it is assumed that the data signal 400 is transmitted via a data bus, in which the first two bits represent the address of the sending device or node and the trailing four bits represent the data or content to be transmitted. Therefore, in FIG. 4 the device with the binary address "10" transmits the binary data "1101" via the bus.

If a frame content condition 8 was defined with a sender address of "10" the identification unit 7, 307 could simply look for that address in address-sub-frames 402 and provide the information about the occurrence to the signal processor 9, 309. The signal processor 9, 309 would then process the data sub-frame 403 of "1101", optionally with the leading address sub-frame, and e.g. create a corresponding eye diagram 312.

Figure 5:
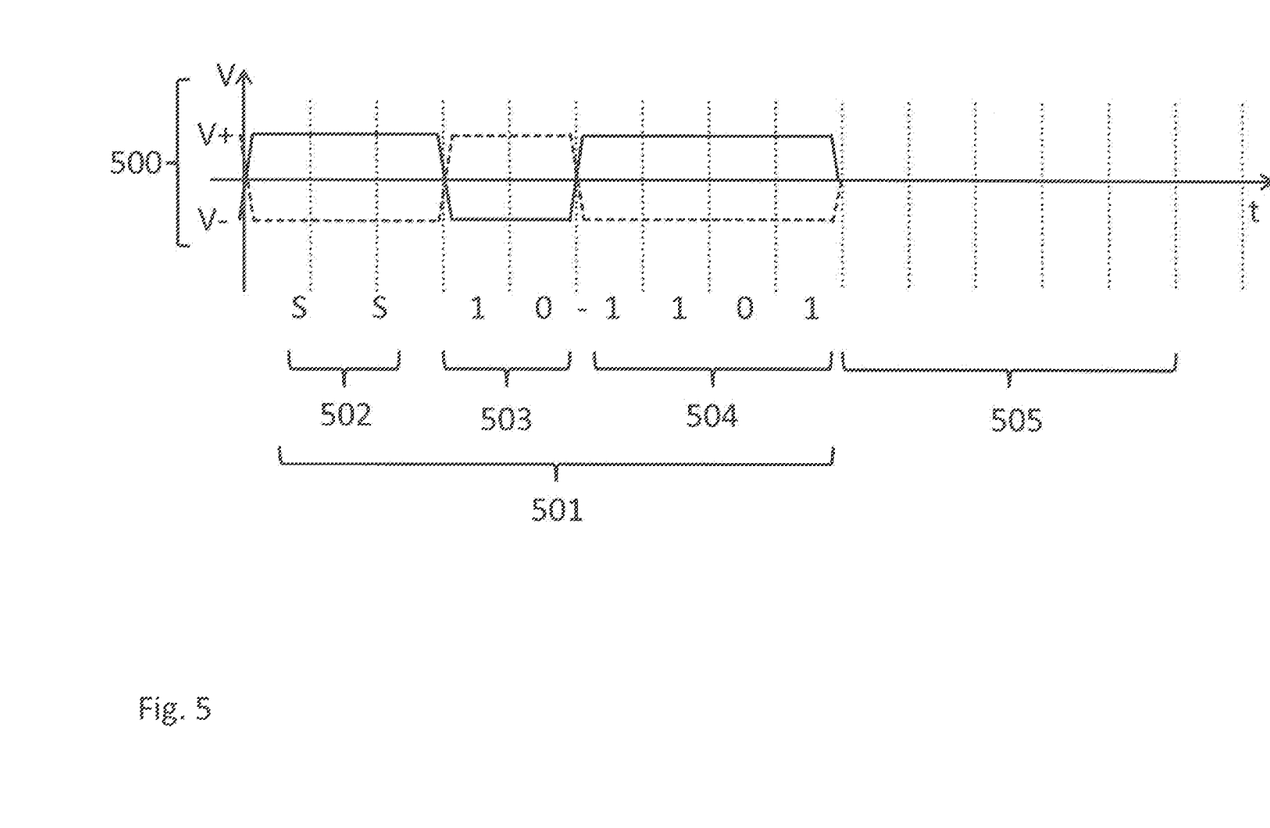
FIG. 5 shows possible content of another data signal.

FIG. 5 exemplarily shows possible frame 501 of another, differential data signal 500. In contrast to FIG. 4 two voltages V+, V− are used to transmit single bits of the frame 501. Furthermore, in FIG. 5 the frame 501 comprises a leading synchronization sub-frame 502, which is transmitted before the address sub-frame 503 and the data sub-frame 504. Trailing the frame 501 is an idle section 505.

The sub-frame 502 can e.g. be sampled by other nodes 60-66, 360-366 of the electronic system 3, 303, which can then adapt their internal clocks accordingly.

In FIG. 5 the leading synchronization sub-frame 502 is followed by the same content as in FIG. 4, "1 0 1 1 0 1", an address sub-frame 503, a data sub-frame 504, and the idle interval 505. In contrast to a non-differential transmission the idle interval 505 can explicitly be identified because a voltage of 0 or the reference voltage is provided in this interval.

Regarding the data signal 500, e.g. a frame content condition 8 can be defined to include all bits of the sub-frames 503, 504 and skip the synchronization sub-frame 592 and the idle interval 505.

The accompanying drawings are included to provide a further understanding of the present invention and are incorporated in and constitute a part of this specification. The drawings illustrate the embodiments of the present invention and together with the description serve to explain the principles of the invention.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. An analysis device for analyzing a data signal in an electronic system comprising:
   a signal input for receiving the data signal,
   a memory unit to buffer the data signal,
   a signal decoder which is coupled to the memory unit and decodes frames of the data signal,
   a first processing unit implemented in circuitry, the first processing unit comprising an identification unit coupled to the signal decoder for identifying a number of the frames and/or at least one sub-frame of the frames which comply with a predetermined frame content condition, and a signal processor which is coupled to the memory unit and processes the data signal according to the identified at least one frame or sub-frame and according to respective timing information, wherein the signal processor generates an eye diagram for sections of the data signal, which correspond to the identified at least one frame or sub-frame.

2. The analysis device according to claim 1, comprising a second processing unit implemented in circuitry, the second processing unit comprising a clock recovery module, which recovers the timing information from a clock of the data signal.

3. The analysis device according to claim 1, wherein the identification unit comprises a clock recovery module, which recovers the timing information from a separate clock signal.

4. The analysis device according to claim 1, wherein the signal processor decomposes sections of the data signal, which correspond to the identified at least one frame or sub-frame, into sections of a predetermined length before and/or after a reference point in time, and superimposes the sections time aligned to generate the eye diagram.

5. The analysis device according to claim 4, wherein the signal processor decomposes the sections of the data signal, which correspond to the identified at least one frame or sub-frame, into the sections of a predetermined length based on the timing information.

6. The analysis device according to claim 1, wherein the identification unit decodes content of the data signal according to a controller area network (CAN)-based bus standard and/or a FlexRay bus standard.

7. The analysis device according to claim 1, wherein the predetermined frame content condition instructs the identification unit to identify frames or sub-frames, which are sent by a specific node in the electronic system.

8. The analysis device according to claim 7, wherein the predetermined frame content condition instructs the identification unit to identify frames or sub-frames, based on a device address of the respective node in the electronic system.

9. The analysis device according to claim 8, wherein the predetermined frame content condition instructs the identification unit to identify frames or sub-frames, based on a device address of the respective node in the electronic system, which is included in an address sub-frame.

10. The analysis device according to claim 1, wherein the predetermined frame content condition instructs the identification unit to identify only data frames or sub-frames of the data signal without synchronization frames or synchronization patterns.

11. The analysis device according to claim 1, wherein the predetermined frame content condition instructs the identification unit to identify only frames or sub-frames transmitted at a specific data rate.

12. The analysis device according to claim 1, wherein the predetermined frame content condition instructs the identification unit to identify only frames or sub-frames of the data signal which comprise actual data transmissions without idle intervals.

13. The analysis device according to claim 1, wherein the predetermined frame content condition instructs the identification unit to identify frames or sub-frames based on a specific address sub-frame and/or a specific sub-frame comprising cyclic redundancy check information.

14. The analysis device according to claim 13, wherein the specific address sub-frame comprises a single node address of a respective node in the electronic system or a number of node addresses, and/or wherein the sub-frame comprising cyclic redundancy check information refers to frames, which are identified by the same cyclic redundancy check error.

15. An analysis method for analyzing a data signal in an electronic system, comprising:
receiving the data signal,
buffering the data signal,
decoding frames of the data signal,
identifying at least one of the frames and/or at least one sub-frame of the frames which comply with a predetermined frame content condition, and
processing the data signal according to the identified at least one frame or sub-frame and according to respective timing information,
wherein processing comprises generating an eye diagram for sections of the data signal, which correspond to the identified at least one frame or sub-frame.

16. The analysis method according to claim 15, wherein the timing information is recovered from a clock of the data signal; and/or
wherein the timing information is recovered from a separate clock signal.

17. The analysis method according to claim 15, wherein processing comprises decomposing the sections of the data signal, which correspond to the identified frames or sub-frames, into sections of a predetermined length before and/or after a reference point in time, and superimposing the sections time aligned to generate the eye diagram.

18. The analysis method according to claim 17, wherein processing comprises decomposing the sections of the data signal, which correspond to the identified at least one frame or sub-frame, into the sections of a predetermined length based on the timing information.

19. The analysis method according to claim 15, wherein decoding comprises decoding content of the data signal according to a predetermined bus standard, especially a field bus standard, especially a controller area network (CAN)-based bus standard and/or a FlexRay bus standard.

20. The analysis method according to claim 15, wherein in the step of identifying the predetermined frame content condition lead to identifying frames or sub-frames:
which are sent by a specific node in the electronic system, and/or
with a specific device address, especially in an address sub-frame, of the specific node in the electronic system; and/or
with only data frames or sub-frames without synchronization patterns; and/or
transmitted at a specific data rate; and/or
which comprise actual data transmissions without idle intervals.

21. The analysis method according to claim 15, wherein the predetermined frame content condition comprises sub-conditions based on a specific address sub-frame and/or a specific sub-frame comprising cyclic redundancy check information,
wherein the specific address sub-frame comprises a single node address of a respective node in the electronic system or a number of node addresses, and/or wherein the sub-frame comprising cyclic redundancy check information refers to frames, which are identified by the same cyclic redundancy check error.

22. A non-transitory computer readable medium comprising computer instructions, which when executed by a processor cause the processor to perform a method comprising:
receiving the data signal,
buffering the data signal,
decoding frames of the data signal,
identifying at least one of the frames and/or at least one sub-frame of the frames which comply with a predetermined frame content condition, and
processing the data signal according to the identified at least one frame or sub-frame and according to respective timing information,
wherein processing comprises generating an eye diagram for sections of the data signal, which correspond to the identified at least one frame or sub-frame.

* * * * *